(12) United States Patent
Tadepalli et al.

(10) Patent No.: US 7,133,238 B2
(45) Date of Patent: Nov. 7, 2006

(54) SERVO TRACK WRITING APPARATUS WITH A HEAD ASSEMBLY SHROUD

(75) Inventors: Srinivas Tadepalli, Eden Prairie, MN (US); Xu Zuo, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 234 days.

(21) Appl. No.: 10/768,236

(22) Filed: Jan. 30, 2004

(65) Prior Publication Data

US 2004/0184180 A1 Sep. 23, 2004

Related U.S. Application Data

(60) Provisional application No. 60/449,566, filed on Feb. 21, 2003.

(51) Int. Cl.
*G11B 21/02* (2006.01)
(52) U.S. Cl. ........................................ 360/75
(58) Field of Classification Search .................. 360/75, 360/70, 98.02, 98.03, 97.03, 105, 255, 244.9
See application file for complete search history.

(56) References Cited

U.S. PATENT DOCUMENTS

| | | | | |
|---|---|---|---|---|
| 4,189,759 A | * | 2/1980 | Bauck et al. | 360/244.9 |
| 4,214,286 A | * | 7/1980 | Ragle et al. | 360/98.03 |
| 4,291,349 A | * | 9/1981 | Ragle et al. | 360/98.02 |
| 4,713,705 A | * | 12/1987 | DeMoss et al. | 360/98.02 |
| 5,818,658 A | * | 10/1998 | Balster et al. | 360/75 |
| 5,898,545 A | | 4/1999 | Schirle | |
| 6,125,003 A | | 9/2000 | Tsuda et al. | |
| 6,188,535 B1 | * | 2/2001 | Lemke et al. | 360/70 |
| 6,259,576 B1 | * | 7/2001 | Ahn | 360/75 |
| 6,449,119 B1 | | 9/2002 | Hashizume et al. | |
| 6,496,327 B1 | | 12/2002 | Xia et al. | |
| 6,542,328 B1 | | 4/2003 | Harrison et al. | |
| 6,956,723 B1 | * | 10/2005 | Suzuki | 360/255 |
| 2002/0008934 A1 | | 1/2002 | Tadepalli et al. | |
| 2002/0015255 A1 | | 2/2002 | Tadepalli et al. | |
| 2002/0036862 A1 | | 3/2002 | Tsang et al. | |
| 2002/0181138 A1 | | 12/2002 | Toffle et al. | |
| 2002/0181148 A1 | | 12/2002 | Dahlenburg et al. | |
| 2002/0196581 A1 | | 12/2002 | Tsang et al. | |

* cited by examiner

*Primary Examiner*—Fred F. Tzeng
(74) *Attorney, Agent, or Firm*—Fellers, Snider, et al.

(57) ABSTRACT

A servo track writing apparatus for recording servo information or patterns on a disc or discs for a data storage device is disclosed. The servo track writing apparatus includes a shroud proximate to and downstream of a cantilevered head assembly to limit DC wander for writing servo information to disc or discs. In particular, the shroud is position in an operating zone or sector of the cantilevered head assembly or between an air dam and stripper of a servo track writing apparatus.

17 Claims, 8 Drawing Sheets

SERVO TRACK WRITING APPARATUS WITH A HEAD ASSEMBLY SHROUD

CROSS-REFERENCE TO RELATED APPLICATION

This application claims priority from U.S. Provisional Application Ser. No. 60/449,566 filed on Feb. 21, 2003 and entitled "FLOW CONTROL FOR MDW WINDAGE MITIGATION".

FIELD OF THE INVENTION

The present invention relates generally to a shroud or shroud assembly for a servo track writer for a data storage device, and more particularly but not by limitation to a head shroud for a cantilevered head assembly of a servo track writer for a data storage device.

BACKGROUND OF THE INVENTION

Data storage devices store digitally encoded information on discs. Heads read from or write data to discs which are supported for rotation relative to a base chassis by a spindle motor or drive. Heads include transducer elements, such as magnetoresistive, magneto-optical or inductive elements for read or write operations. An actuator assembly moves the head relative to select data tracks on the disc to read or write data to the disc surface or media. The head is positioned relative to tracks via a servo control system based upon servo information or patterns on a rotating disc or discs. For example, servo patterns or information can be encoded on a disc or discs between data sectors of each track of a disc "embedded servo information" or on a surface of a dedicated disc or "dedicated servo".

Servo information or patterns are pre-recorded or written during manufacture of the data storage device for example, via a dedicated servo track writing apparatus. Multi-disc servo track writers are used to prerecord servo patterns or information to a plurality of discs for high-density recording. Recording density is increasing requiring more accurate servo control feedback which is limited by alignment of the recorded servo patterns or information on the disc or discs. Embodiments of the present invention provide solutions to these and other problems, and offer other advantages over the prior art.

SUMMARY OF THE INVENTION

The present invention relates to a servo track writing apparatus for recording servo information or patterns on a disc or discs for a data storage device. The servo track writing apparatus includes a shroud proximate to and downstream of a cantilevered head assembly to limit DC wander for writing servo information to disc or discs. In particular, the shroud is positioned in an operating zone or sector of the cantilevered head assembly or between an air dam and stripper of a servo track writing apparatus. Other features and benefits that characterize embodiments of the present invention will be apparent upon reading the following detailed description and review of the associated drawings.

BRIEF DESCRIPTION OF THE DRAWINGS

FIG. 6 illustrates an embodiment of a vertical servo track writer or apparatus including a cantilevered head assembly and shroud.

DETAILED DESCRIPTION OF ILLUSTRATIVE EMBODIMENTS

Servo information or patterns are used to control head position relative to a disc or data storage media (e.g. track following or to control movement of a head from one track to another during a seek operation). Track density or tracks per inch (TPI) parameters are limited based upon alignment of encoded servo information or patterns on the disc. Servo information or patterns of prior assemblies or devices were encoded at a drive level after assembly of the head suspension or assembly and disc in a data storage device. As tracks per inch (TPJ) parameters of data storage devices increase more accurate alignment for recorded servo patterns or information on the disc surface is required. Embodiments of the present invention relate to a servo track writer or apparatus to record servo data to a disc including a dedicated servo head and shroud therefor to control DC wander and track misregistration.

Figure 1:
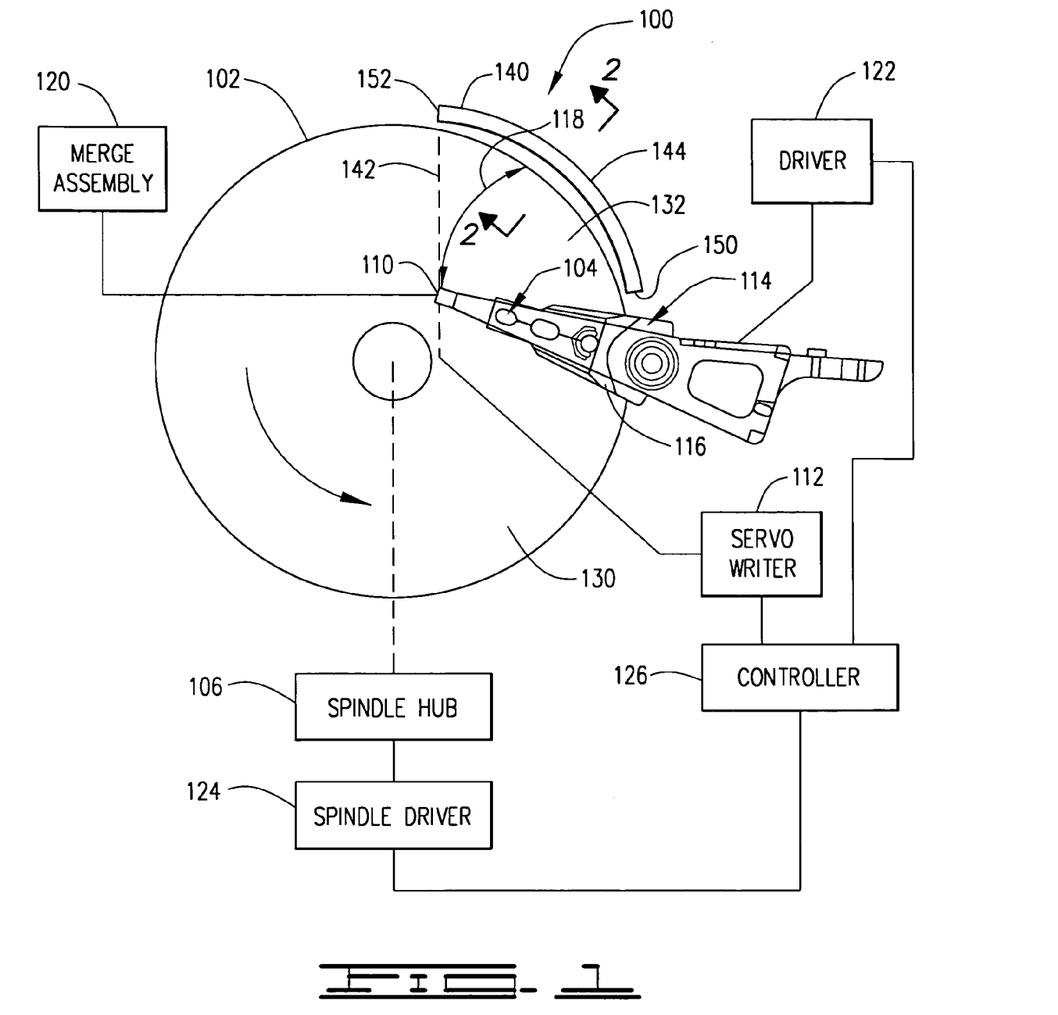
FIG. 1 schematically illustrates an embodiment of a servo track writer or apparatus including a shroud for a cantilevered head assembly.

FIG. 1 schematically illustrates a servo track writer or apparatus 100 to record servo patterns or information (not shown) on discs 102. As shown, the servo track writer or apparatus 100 includes a cantilevered head assembly 104 and spindle hub 106. The cantilevered head assembly 104 includes a servo head 110 to encode servo information or patterns to a disc supported by the spindle hub 106. The head 110 is energized via a servo writer 112 to encode servo patterns or information on the disc surface.

In the embodiment shown or an illustrative embodiment, the cantilevered head assembly 104 includes a head suspension assembly coupled to a cantilevered arm of a servo actuator assembly 114. The cantilevered arm of the servo actuator assembly 114 extends from an actuator block 116 which is movable relative to the disc 102 as illustrated by arrow 118 via operation of actuator driver 122 to position the servo head 110 relative to the disc surface.

Disc or discs are rotated on the spindle hub 106 by a spindle driver 124 for servo recording operation. A controller 126 energizes the driver 122 to move actuator block 116 to position the servo head 110 in cooperation with operation of servo writer 112 to record servo information to the disc or media. Preferably, servo head 110 is positioned relative to the disc using a laser interfometer for measuring the angular displacement and positioning of the servo head 110. As shown, driver 124 is energized to rotate the disc to record servo information to the disc via controller 126.

The spindle hub 106 and cantilevered head assembly 104 are movable between a retracted position to load and unload disc(s) and a merged position to record servo information by a merge assembly 120. Disc or discs are loaded onto the spindle hub 106 in the retracted position and the spindle hub 106 and cantilevered head assembly 104 are moved to the merged position to record servo information or servo patterns on the discs. Spindle hub 106 and the cantilevered head assembly 104 are operably supported relative to a rigid structure, for example a granite slab (as schematically illustrated) to limit vibration or movement during the servo track writing process.

Thus for operation the disc or discs are rotated via the spindle driver 124 to write or encode servo information or patterns on the disc surface via the servo writer 112. Rotation of the disc or discs creates a flow field proximate to the disc surface. As shown, the cantilevered head assembly 104 is cantilevered from actuator block 116 to form a cantilevered body in the flow field. Flow is restricted proximate to the cantilevered body to provide a pressure profile having a pressure differential between an upstream flow region 130 of the cantilevered body or cantilevered head assembly and a downstream flow region 132 of the cantilevered body. Disturbances or turbulence in the flow field can introduce fluctuations in the pressure profile across the cantilevered head assembly effecting accuracy or alignment of the encoded servo information.

As shown, the servo writer or apparatus of the present invention includes a shroud 140 proximate to the downstream region 132 of the cantilevered head assembly 104 to reduce the pressure differential or disturbances proximate to or across the cantilevered head assembly 104. As shown, shroud 140 is positioned proximate to an operating region or sector 142 of the head or cantilevered head assembly proximate to an edge of the disc or disc surface to contain air flow and limit turbulence. In a preferred embodiment, shroud is approximately 100 mils from the disc edge, although application is not limited to the specific dimension disclosed.

Figure 2:
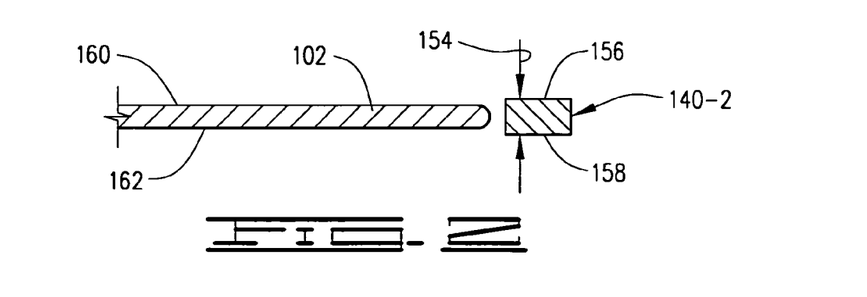
FIG. 2 is a cross sectional view taken along line 2—2 of FIG. 1.

In the illustrated embodiment shroud 140 is formed of a relatively contoured body 144. The contoured body 144 has a length extending between a proximal end 150 and a distal end 152. The proximal end 150 of the shroud 140 is positioned adjacent to the cantilevered head assembly and the distal end 152 is spaced therefrom to provide a shroud length extending relative to the operating region or sector 142 of the cantilevered head assembly. In an illustrated embodiment, as shown in FIG. 2 where like numbers are used to refer to like parts in the previous FIGS., shroud 140-2 has a dimension 154 corresponding to a thickness dimension of the disc to provide opposed surfaces 156, 158 of the shroud generally flush with opposed surfaces 160, 162 of the disc, although application is not limited to the specific dimensions shown.

Figure 3:
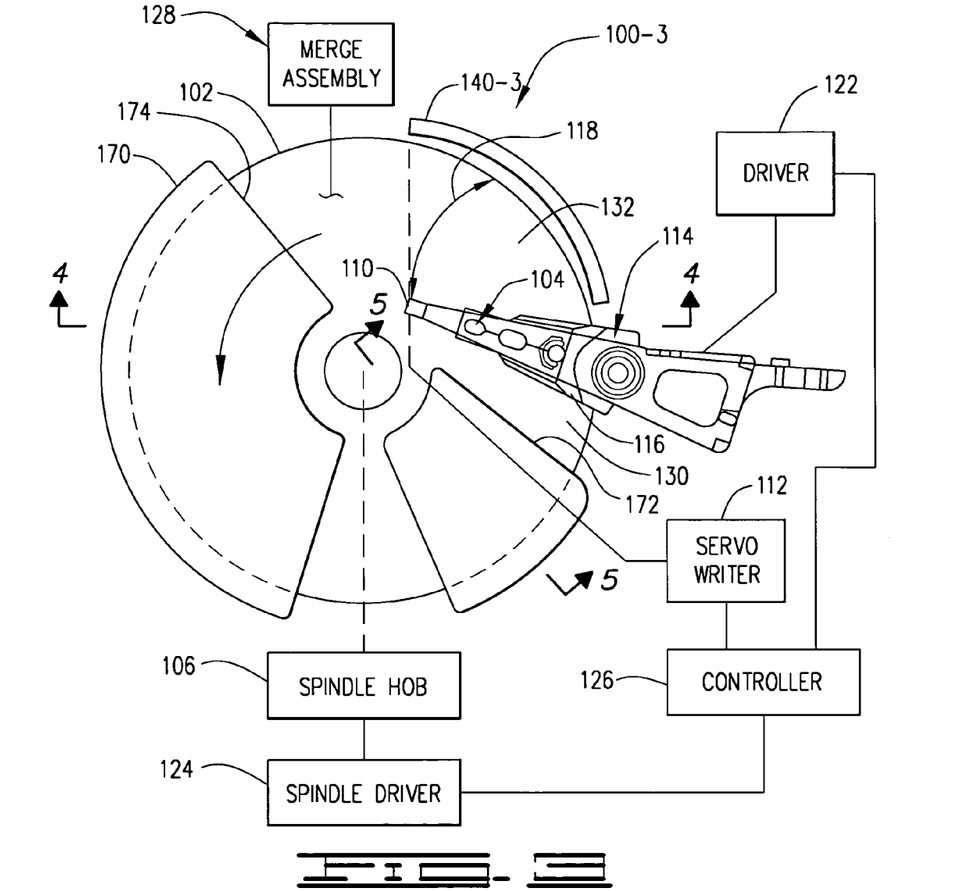
FIG. 3 schematically illustrates an embodiment of a servo track writer or apparatus including a shroud and an air dam and stripper assembly.

FIG. 3 schematically illustrates an embodiment of a servo track writer or apparatus 100-3 where like numbers are used to refer to like parts in the previous figures. Servo track writer or apparatus 100-3 includes an air dam 170 and a stripper 172 to condition flow in the flow field proximate to the disc 102. Air dam 170 restricts flow to provide a high pressure region proximate to a leading edge 174 of the air dam 170 downstream of the cantilevered head assembly and stripper 172 is positioned upstream of the cantilevered head assembly 104. Shroud 140-3 of writer 100-3 is positioned proximate to the cantilevered head assembly 104 between the air dam 170 and stripper 172 to reduce a pressure differential or control flow in a gap region between the air dam 170 and the stripper 172.

Figure 4:
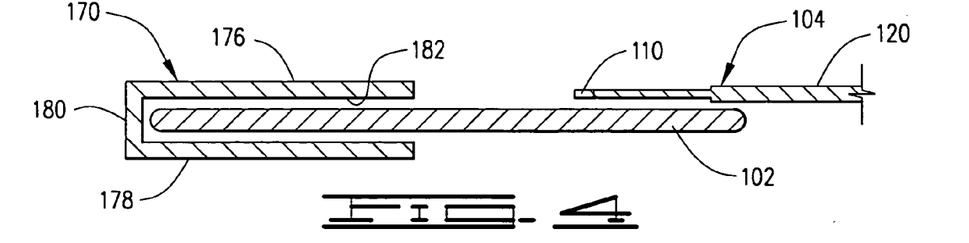
FIGS. 4–5 are cross sectional views taken along lines 4—4 and 5—5, respectively of FIG. 3.

FIG. 4 illustrates a cross sectional view of an embodiment of the air dam 170. As shown, the air dam 170 includes spaced flow plates 176, 178 extending from an edge portion or body 180 and having a gap 182 therebetween. A disc is positioned relative to the gap 182. Disc rotates within the gap 182 and plates 176, 178 are aligned relative to the flow field proximate to the disc surface to provide a high-pressure zone proximate a leading edge 174 of the air dam 170 downstream of the cantilevered head assembly as shown in FIG. 3. Edge portion or body 180 is contoured relative to the disc edge to provide a boundary wall to restrict air or other media flow.

Figure 5:
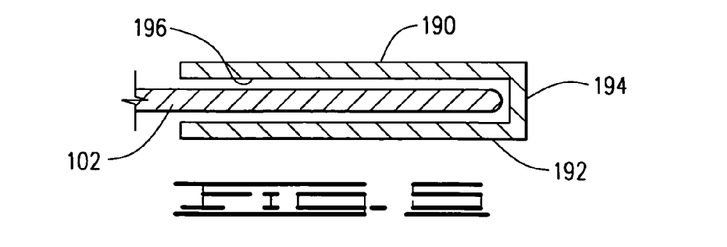

Flow to the cantilevered head assembly 104 is conditioned by the stripper 172 upstream of the cantilevered head assembly 104. Air stripper 172 is positioned proximate to the upstream region 130 and includes spaced stripper plates 190, 192 extending from an edge or body portion 194 and gap 196 therebetween as shown in FIG. 5. Disc rotates within gap 196 so that the stripper plates 190, 192 are positioned proximate to the flow field or disc surface upstream of the cantilevered head assembly. Shroud 140 provides an edge body in the gap region of the cantilevered head assembly between the air dam 170 and stripper 172 to inter alia control the pressure differential across the cantilevered head assembly 104.

Servo information or patterns are written to a plurality of disc by a multi disc servo writer. FIG. 6 illustrates an embodiment of a vertical multiple disc servo writer or apparatus 100-6 including a shroud 140-6 where like numbers are used to refer to like parts in the previous figures. The multiple disc servo writer or apparatus 100-6 is used to write servo information to a plurality of discs or a disc stack supported by a multiple disc spindle hub 106-6 via a plurality of cantilevered head assemblies 104-6 extending from actuator block 116-6. In the illustrated embodiment, the spindle hub 106-6 has a generally horizontal position relative to a platform or base 200 to vertically support discs (or a plurality of discs) for vertically orientated servo writing. Discs are removably secured relative to the spindle hub 106-6 by a clamp 198.

As shown in FIG. 6, spindle hub 106-6 is stationary supported relative to platform 200 by a spindle block 202 and the cantilevered head assemblies 104-6 (or actuator block 116-6) are movably supported relative to the base or platform 200 as illustrated by arrow 206 via servo block 204. Servo block 204 is movable between a retracted position (shown in FIG. 6) and a merged position shown in FIG. 7 to selectively position the spindle hub 106-6 and cantilevered head assemblies 104-6 between the retracted position to load and unload discs and the merged position to record servo information. Although servo block 204 is movably supported in the illustrated embodiment of FIG. 6, application is not so limited and the spindle block 202 or both the spindle block and servo block can be movable between a retracted position and a merged position. As previously described, platform or base 200 is formed of a relatively impact or vibration resistant structure, such as a granite slab, to restrict movement of the apparatus or components during the servo writing process.

As shown, the apparatus 100-6 includes a shroud assembly including an actuator assembly or driver 210. Shroud actuator or driver 210 moves the shroud 140-6 between a retracted position and an operating or engaged position proximate to the disc or discs in FIG. 6. Driver 210 is illustrated schematically and can include hydraulic, pneumatic or mechanical devices that are operable or energizable to move the shroud 140-6 between the retracted position and the operating or engaged position. In the illustrated embodiment, an air dam 170 and stripper 172 are supported relative to discs (or spindle hub 106-6) and are operable between an opened or retracted position (shown in FIG. 6) and a closed or merged position (shown in FIG. 7) by a cam or actuator mechanism 212. In an embodiment, operation of the shroud driver or actuator 210, cam or actuator mechanism 212, and merge assembly are automated by a controller to selectively load and unload discs and write servo information to the loaded discs.

For operation disc pack or discs 102-6 is loaded onto spindle hub 106-6 while the shroud 140-6 is retracted and the air dam 170 and stripper 172 are in the opened or retracted position. Thereafter the servo block 204 is moved relative to arrow 206 to merge the plurality of cantilevered head assemblies 104-6 of block 116-6 relative to the plurality of discs of the disc pack. Thereafter, air dam 170 and stripper 172 are moved to the closed or merged position and the shroud 140-6 is moved to the operating position proximate to the discs or disc stack. Although FIG. 6 illustrates a movable servo block 204 and stationary spindle block 202 application is not limited to the particular embodiment described, as previously discussed.

Figure 7:
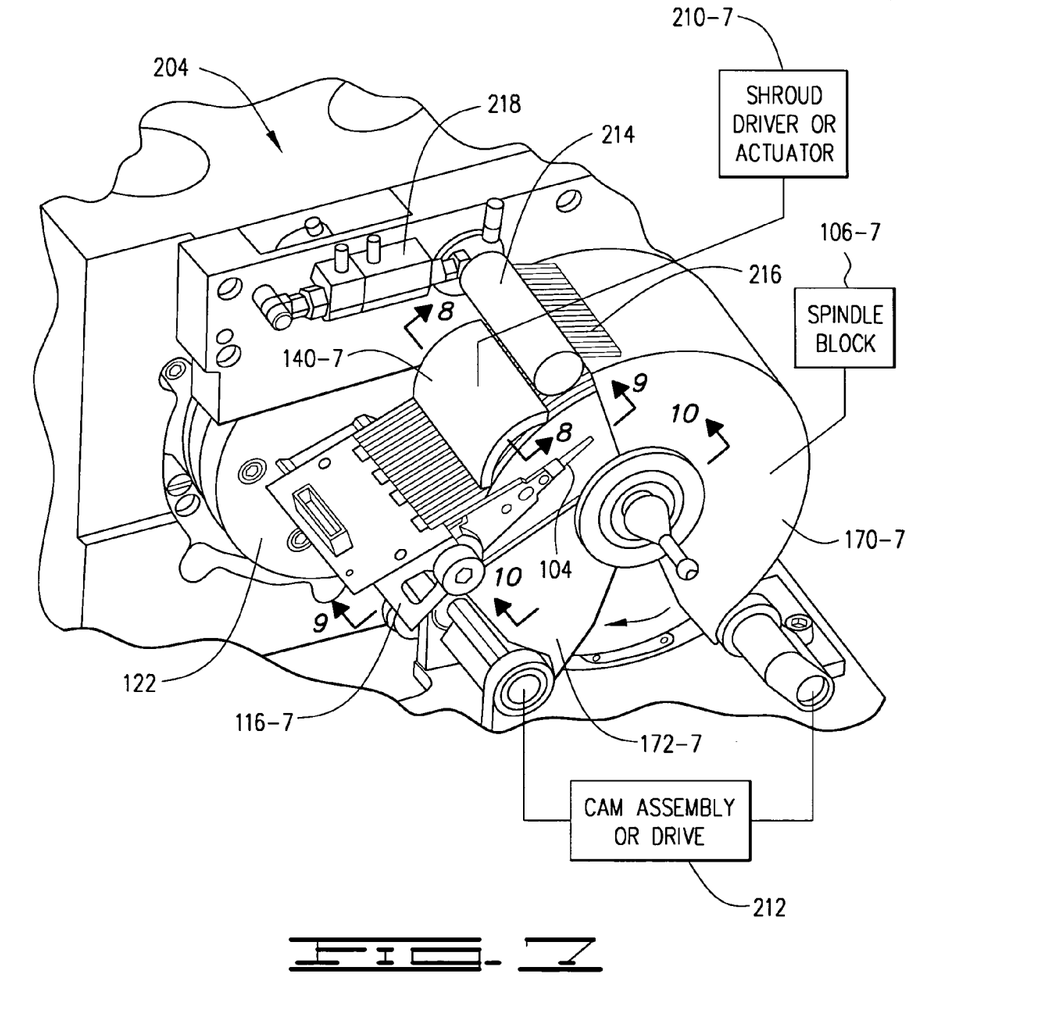
FIG. 7 is a detailed illustration of an enlarged portion of a vertical servo track writer or apparatus having a cantilevered head assembly and shroud coupled to a servo block of the servo track writer or apparatus.
Figure 8:
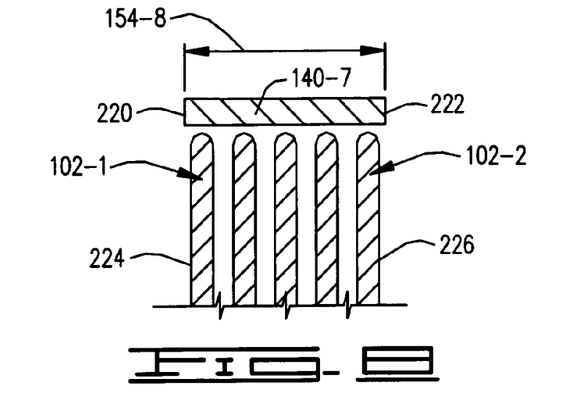
FIGS. 8–10 are cross sectional views taken along lines 8—8, 9—9, 10—10, respectively of FIG. 7.

FIG. 7 is a detailed illustration of an embodiment of a servo track writer or apparatus where the shroud 140-7 is coupled to and supported by the servo block 204 proximate to the actuator block 116-7 and is positionable from the retracted position (not shown in FIG. 7) to the operating or engaged position via actuator or driver 2 10-7 illustrated diagrammatically. Air dam 170 and stripper 172 are in the closed merged position relative to the discs or disc stack as shown in FIG. 7 via operation of the cam or actuator mechanism 212. A cam or ramp 214 maintains separation of the heads 110 to merge the discs and the cantilevered head assemblies for servo writing operation. In particular, cam or ramp 214 includes a plurality of fingers 216 spaced relative to the discs to engage the heads 110 to maintain separation for merge operations. The cam or ramp 214 is coupled to the servo block 204 in the embodiment shown to move between a retracted position spaced from the discs and a merged position via cam actuator 218.

Figure 9:
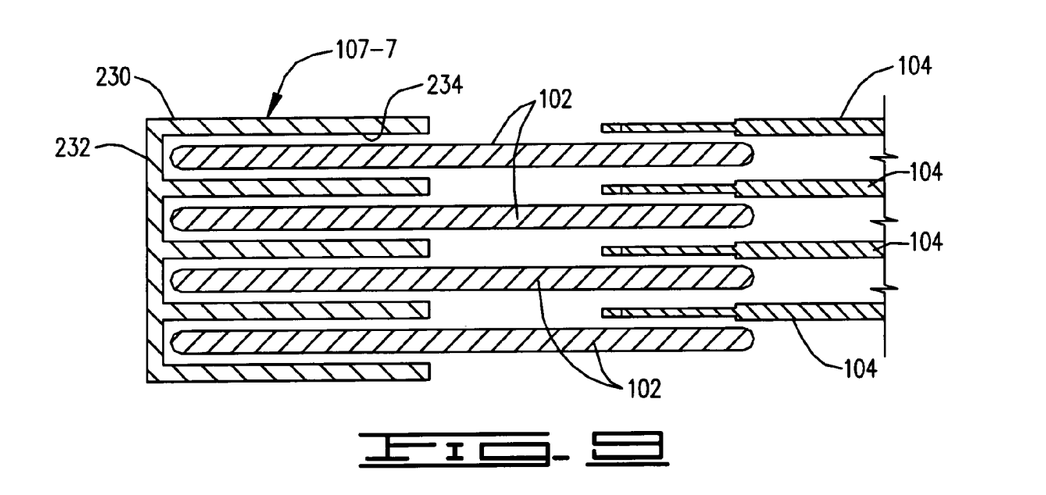
Figure 10:
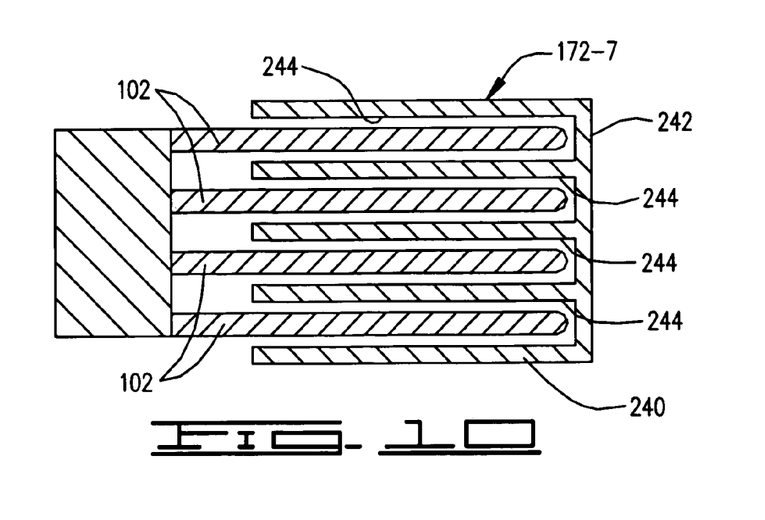

As shown shroud 140-7 has a dimension 154-8 which extends between inner and outer discs 102-1, 102-2 supported on the spindle block 106-7 to provide a flow boundary proximate edges of the discs. In particular, outer surfaces 220, 222 of the shroud 140-7 are flush with outer surfaces 224, 226 of the inner and outer discs 102-1, 102-2 respectively. As shown in FIGS. 9–10, air dam 170-7 includes a plurality of stacked plates 230 coupled to an edge portion or body 232 to form gap 234 and stripper 172-7 includes a plurality of stacked plates 240 extending from edge portion or body 242 to form gaps 244. Discs rotate in gaps 234, 244 and plates 230, 240 are aligned proximate to the flow field of the disc surface, as previously described.

Figure 11:
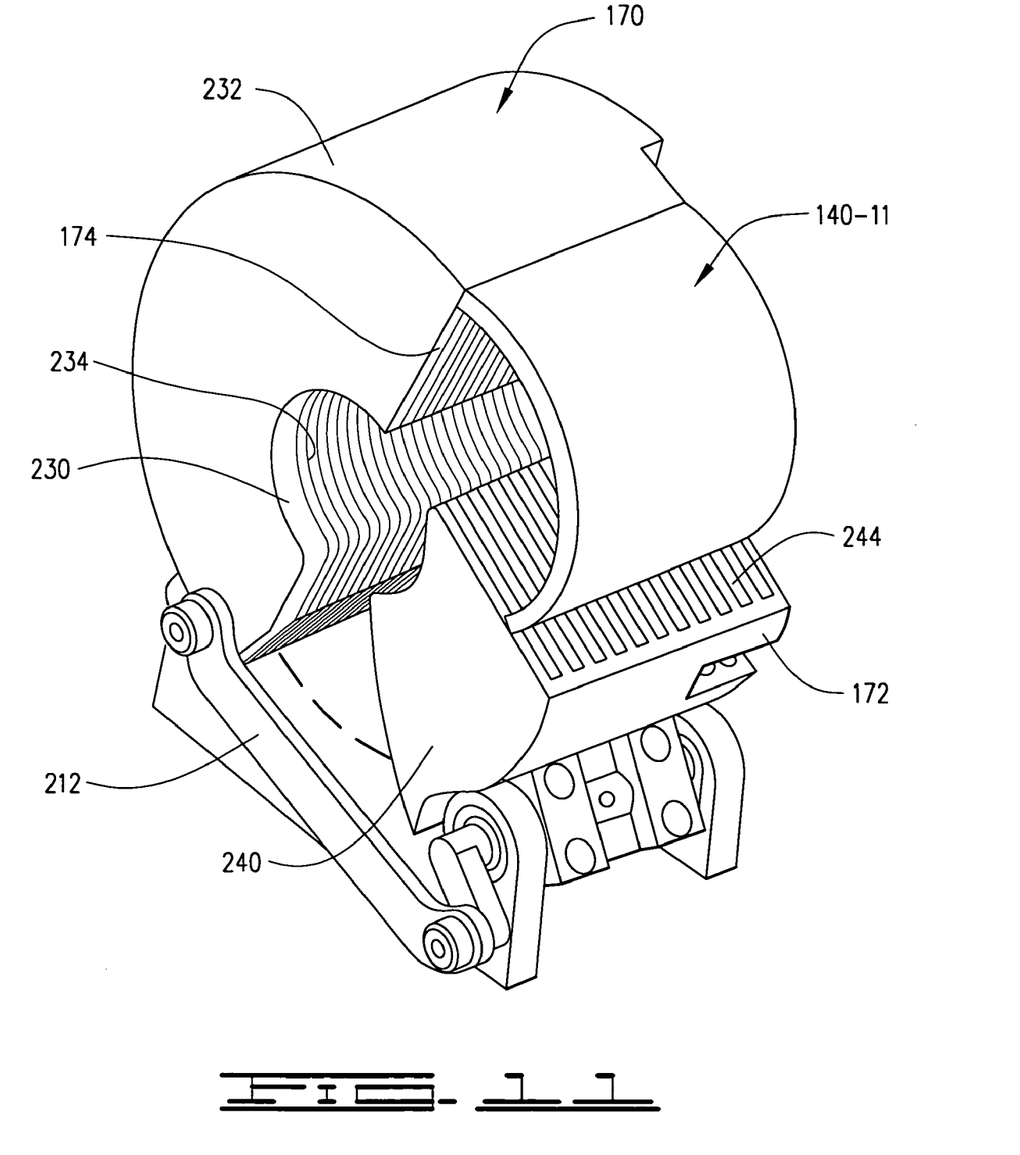
FIG. 11 illustrates an embodiment of a stripper and air dam assembly including a shroud for an embodiment of a servo track writer or apparatus of the present invention.
Figure 12:
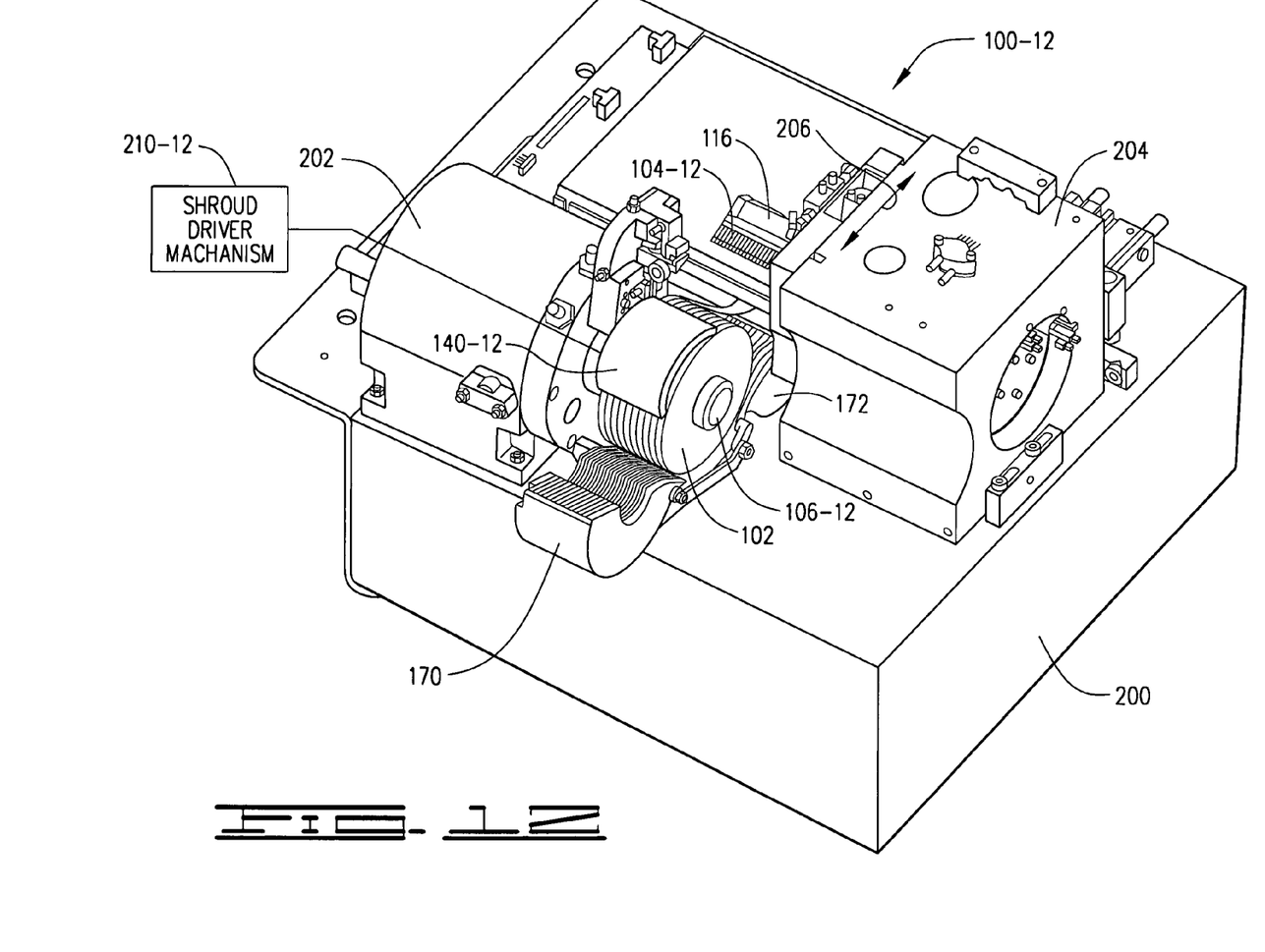
FIG. 12 illustrates an embodiment of a vertical servo track writer or apparatus including a shroud coupled to a spindle block of the servo track writer or apparatus.

In an alternate embodiment illustrated in FIG. 11, shroud 140-11 is coupled to the air dam 170 and supported thereby. As shown air dam 170 is movable between a retracted position and a merged position via the cam assembly or actuator mechanism 212 and shroud 140-11 is thus movable therewith to position the shroud between the operating or engaged position proximate to the cantilevered head assemblies or the retracted position as previously described. In another alternate embodiment illustrated in FIG. 12, shroud 140-12 is coupled to the spindle block 202 and is actuated from a retracted position to the operating position via driver or actuator 210-12 coupled thereto.

Figure 13:
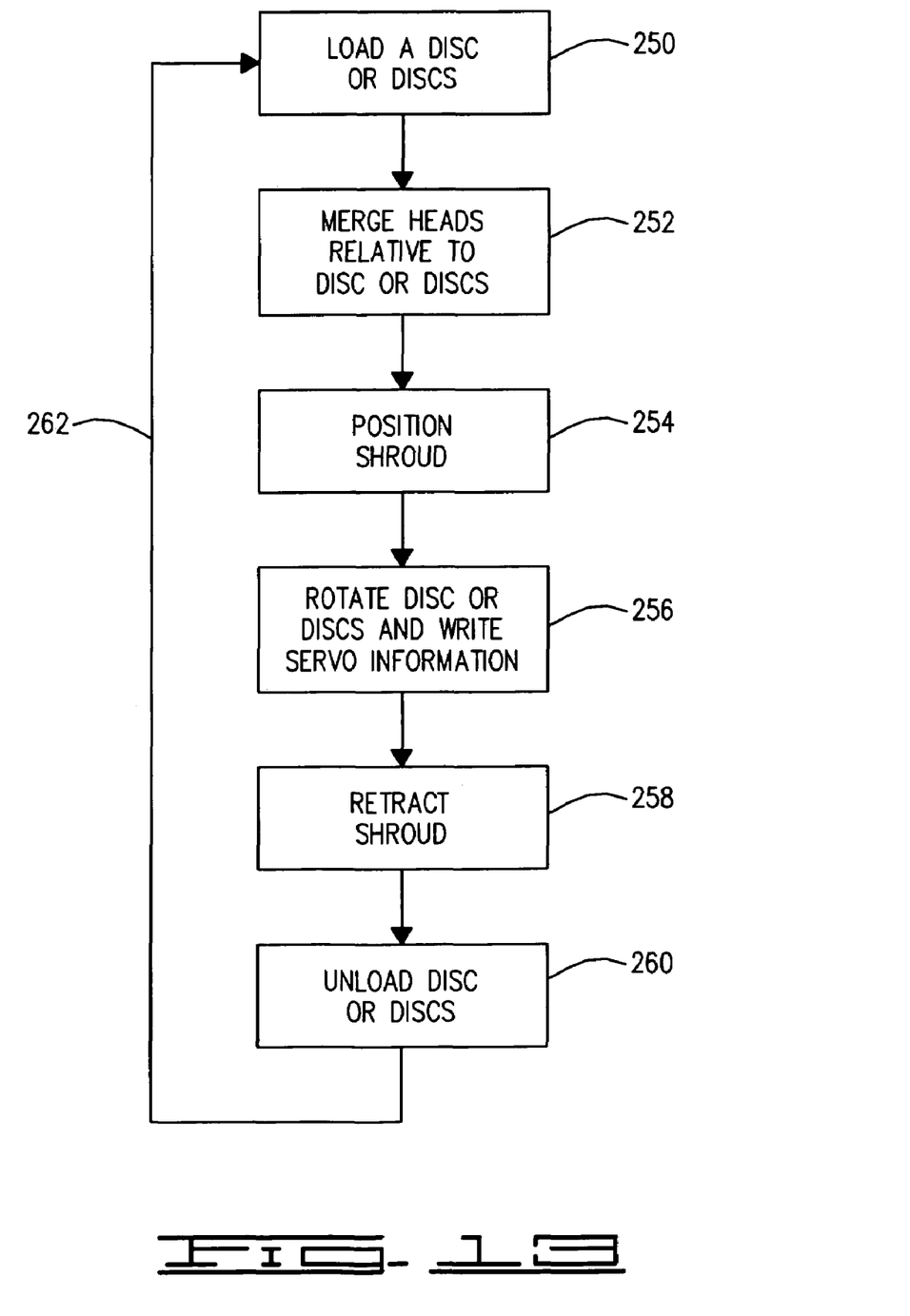
FIG. 13 is a flow chart of an embodiment for encoding servo track information or patterns of the present invention.

Thus as illustrated in FIG 13, to write servo information, discs or discs are loaded on the spindle hub as illustrated by block 250. The disc or discs and cantilevered head assemblies are merged as illustrated by block 252. Shroud is aligned or positioned relative to the loaded disc or discs as illustrated by block 254 and the disc or discs are rotated to write servo information as illustrated by block 256. Upon completion, the shroud is retracted as illustrated by block 258. The completed discs are unloaded as illustrated by block 260 and assembled in a data storage device or disc drive. Thereafter, the process is repeated as illustrated by line 262 to record servo information to additional discs. As previously described, the shroud provides a boundary along an edge portion of the disc or discs along an operating sector of the cantilevered head assembly or assemblies to limit or reduce the pressure differential across the cantilevered head assembly or assemblies.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although preferred embodiments described herein are illustrated with respect to a particular data storage device or system it will be appreciated by those skilled in the art that the teachings of the present invention can be applied to other storage devices or systems without departing from the scope and spirit of the present invention.

What is claimed is:

1. A servo writer comprising:
   a transducer configured for a data transfer relationship with a storage medium;
   a fluid stripper upstream of the transducer in relation to a direction of storage medium movement;
   a fluid dam downstream of the transducer in relation to the direction of storage medium movement; and
   an actuator configured for imparting movement to the dam and the stripper between a merged position to enclose a portion of the medium and a retracted position to clearingly unenclose the storage medium.

2. The servo writer of claim 1 wherein the stripper in the merged position has a first surface in close mating engagement with an edge of the storage medium.

3. The apparatus servo writer of claim 2 wherein the stripper in the merged position has a second surface in close mating engagement with a data storage surface extending from the edge of the storage medium.

4. The servo writer of claim 3 wherein the stripper in the merged position has a third surface in close mating engagement with an opposing surface to the data storage surface.

5. The servo writer of claim 1 wherein the storage medium rotates in relation to the transducer.

6. The servo writer of claim 1 further comprising a linkage transferring the movement imparted by the actuator to one of the dam and the stripper to impart movement to the other of the dam and the stripper between the merged and retracted positions.

7. The servo writer of claim 1 wherein the fluid stripper movement is characterized as being pivotal movement around a pivot point.

8. The servo writer of claim 7 wherein the fluid dam movement is characterized as being pivotal movement around a pivot point.

9. A servo writer comprising:
   a transducer configured for a data transfer relationship with a storage medium;
   an enclosure operably movable between a merged position to enclose a portion of the storage medium and a retracted position to clearingly unenclose the storage medium, the enclosure comprising:
      a stripper upstream of the transducer in relation to a direction of storage medium movement;
      a dam downstream of the transducer; and
      a shroud fixed in movement with the dam and operably disposed in a close mating engagement with an edge of the storage medium between the stripper and the dam.

10. The servo writer of claim 9 further comprising an actuator configured for imparting movement to the dam and the stripper between the merged position and the retracted position.

11. The servo writer of claim 10 further comprising a linkage transferring the movement imparted by the actuator to one of the dam and the stripper to impart movement to the other of the dam and the stripper between the merged and retracted positions.

12. The servo writer of claim 9 wherein the enclosure in the merged position has a first surface in close mating engagement with an edge of the storage medium.

13. The servo writer of claim 9 wherein the enclosure in the merged position has a second surface in close mating engagement with a data storage surface extending from the edge of the storage medium.

14. The servo writer of claim 9 wherein the enclosure in the merged position has a third surface in close mating engagement with an opposing surface to the data storage surface.

15. The servo writer of claim 9 wherein the storage medium rotates in relation to the transducer.

16. The servo writer of claim 9 wherein the stripper movement is characterized as being pivotal movement around a pivot point.

17. The servo writer of claim 9 wherein the dam movement is characterized as being pivotal movement around a pivot point.

* * * * *